US012006990B2

(12) United States Patent
Davies

(10) Patent No.: US 12,006,990 B2
(45) Date of Patent: Jun. 11, 2024

(54) RADIATING SPACER FOR A BRAKE PAD AND BRAKING SYSTEM

(71) Applicant: Federal-Mogul Motorparts LLC, Southfield, MI (US)

(72) Inventor: John Davies, Savona (IT)

(73) Assignee: FEDERAL-MOGUL MOTORPARTS LLC, Southfield, MI (US)

( * ) Notice: Subject to any disclaimer, the term of this patent is extended or adjusted under 35 U.S.C. 154(b) by 120 days.

(21) Appl. No.: 17/306,695

(22) Filed: May 3, 2021

(65) Prior Publication Data

US 2022/0349450 A1    Nov. 3, 2022

(51) Int. Cl.

| F16D 65/095 | (2006.01) |
| B60T 1/06 | (2006.01) |
| F16D 55/225 | (2006.01) |
| F16D 65/78 | (2006.01) |
| F16D 65/847 | (2006.01) |

(52) U.S. Cl.
CPC ......... F16D 65/095 (2013.01); F16D 55/225 (2013.01); F16D 65/847 (2013.01); *B60T 1/065* (2013.01); *F16D 2065/788* (2013.01); *F16D 2200/0021* (2013.01)

(58) Field of Classification Search
CPC .... F16D 65/095; F16D 55/225; F16D 65/847; F16D 2065/789; F16D 2065/788; F16D 2200/0021; B60T 1/065
See application file for complete search history.

(56) References Cited

U.S. PATENT DOCUMENTS

| 4,181,199 | A | * | 1/1980 | Flotow | ................. F16D 55/224 188/72.9 |
| 5,762,166 | A | * | 6/1998 | Yano | ................... F16D 65/0006 188/264 G |
| 6,116,384 | A | * | 9/2000 | Matsumoto | ......... F16D 65/0971 188/73.31 |
| 6,213,257 | B1 | | 4/2001 | Yano et al. | |
| 6,481,545 | B1 | * | 11/2002 | Yano | ....................... B32B 15/06 188/264 G |
| 10,309,473 | B2 | | 6/2019 | Horton | |
| 10,364,856 | B2 | * | 7/2019 | Lindsly | ............... F16D 65/0006 |

(Continued)

FOREIGN PATENT DOCUMENTS

| DE | 10043528 A1 | 3/2002 |
| DE | 102007020884 A1 | 11/2008 |
| JP | 2000249174 A | 9/2000 |

(Continued)

*Primary Examiner* — Pamela Rodriguez
(74) *Attorney, Agent, or Firm* — REISING ETHINGTON P.C.

(57) ABSTRACT

A radiating spacer includes a plate body having a backing plate facing side and a caliper facing side, with the backing plate facing side having a plurality of cooling grooves and the caliper facing side having a planar caliper piston contact area. The cooling grooves extend partially into the plate body to provide additional cooling of the brake pad and braking assembly. The planar caliper piston contact area is configured to provide a flat surface for contact with a caliper piston. In some embodiments, the radiating spacer and the backing plate are made from different metal materials having certain thermal conductivity coefficients to help promote advantageous heat distribution.

15 Claims, 3 Drawing Sheets

(56) References Cited

U.S. PATENT DOCUMENTS 11,306,789 B2 * 4/2022 Andersson .......... F16D 65/0012

FOREIGN PATENT DOCUMENTS

| JP | 2001050317 A2 | 2/2001 |
| JP | 2009216121 A2 | 9/2009 |
| JP | 2013029156 A2 | 2/2013 |
| JP | 2014134232 A | 7/2014 |
| KR | 20090008670 A | 1/2009 |

* cited by examiner

RADIATING SPACER FOR A BRAKE PAD AND BRAKING SYSTEM

TECHNICAL FIELD

This invention generally relates to braking systems and, in particular, to backing plate shims or spacers for brake pads.

BACKGROUND

Brake pads are used in a variety of vehicles of varying size, including motorcycles, automobiles, railway applications, and trucks, and generally include a backing plate and a friction pad attached to the backing plate. Braking over time wears the friction material of the friction pad, which results in the overall thickness of the brake pads reducing. This can cause the brake caliper piston or pistons (e.g., a sliding caliper or an opposed piston caliper, respectively), that push against the brake pad backing plates to extend out further from the piston housings in the caliper, in order to maintain the requisite clamping force.

Once brake pads wear below a certain overall thickness, the driver may complain of spongey pedal. With spongey pedal, the brake pedal feel has changed as compared to when the brake pads are newly fitted with full thickness. The pedal becomes more compressible as compared to when full thickness brake pads are used, and results in an increase in pedal travel to achieve a given in-line pressure in the braking hydraulic circuit.

One of the major contributing factors to the increase in pedal travel and spongey pedal feel is the brake caliper pistons extending out of the caliper as the brake pads wear. With the extra extension of the pistons, more brake fluid is drawn into the brake system's hydraulic circuit from the fluid reservoir as the caliper pistons extend out. This results in an increase in the amount of fluid in the hydraulic circuit and can result in an increase in the overall compressibility.

Compressibility can also be impacted by temperature. Brake fluid temperature increase is linked primarily to an increase in the brake caliper temperature. Brake calipers increase in temperature from the heat generated during braking. The heat is absorbed via different heat transfer mechanisms. The two major sources are radiative heat from the brake disc and conductive heat transfer from the brake pad backing plate to the caliper pistons. In view of the above, facilitating improved thermal transfer in the braking system and limiting compressibility are desirable.

SUMMARY

According to one embodiment, there is provided a radiating spacer for a brake pad, comprising a plate body having a backing plate facing side and a caliper facing side, and a plurality of cooling grooves in the backing plate facing side of the plate body. Each cooling groove of the plurality of cooling grooves extends only partially into the plate body. The radiating spacer further comprises a planar caliper piston contact area located on the caliper facing side of the plate body, wherein the planar caliper piston contact area is configured to provide a flat surface for contact with a caliper piston.

In some embodiments, each cooling groove of the plurality of cooling grooves is a rounded U-shaped channel.

In some embodiments, the plate body is steel-based or titanium-based.

In some embodiments, the plate body is configured to be used on a plurality of different brake pads.

In some embodiments, the plurality of cooling grooves covers 50% or more of the backing plate facing side of the plate body.

In some embodiments, the flat surface of the planar caliper piston contact area covers a continuous 80% or more of the caliper facing side of the plate body.

In some embodiments, the radiating spacer is part of a brake pad having a backing plate coupled to the radiating spacer and a friction pad coupled to the backing plate.

In some embodiments, the backing plate is made from a first metal material and the plate body of the radiating spacer is made from a second metal material and the second metal material has a lower thermal conductivity coefficient than the first metal material.

In some embodiments, the first metal material is steel-based and the second metal material is titanium-based.

In some embodiments, the backing plate is coupled to the radiating spacer via a removable attachment.

In some embodiments, a thickness of the plate body of the radiating spacer correlates with a corresponding loss of thickness in the friction pad.

In some embodiments, the brake pad is part of a braking system comprising a caliper holding the brake pad, with the caliper having a piston. The piston is configured to contact the planar piston contact area of the caliper facing side of the plate body of the radiating spacer.

In some embodiments, the caliper has a plurality of pistons and each piston of the plurality of pistons is configured to contact the planar piston contact area.

In accordance with another embodiment, there is provided a brake pad comprising a friction pad and a backing plate made from a first metal material. The backing plate is coupled to the friction pad. The brake pad includes a radiating spacer coupled to the backing plate. The radiating spacer comprises a plate body having a plurality of cooling channels. The plate body is made from a second metal material, and the second metal material has a lower thermal conductivity coefficient than the first metal material.

In some embodiments, the first metal material is tensile steel and the second metal material is stainless steel.

In some embodiments, the first metal material is steel-based and the second metal material is titanium-based.

In yet another embodiment, there is provided a braking system comprising a brake pad having a radiating spacer, a backing plate coupled to the radiating spacer, and a friction pad coupled to the backing plate. The radiating spacer has a plate body with a backing plate facing side and a caliper facing side, with a planar caliper piston contact area located on the caliper facing side. The braking system includes a caliper holding the brake pad. The caliper has a piston and the piston is configured to contact the planar caliper piston contact area.

In some embodiments, the caliper has a plurality of pistons and each piston of the plurality of pistons is configured to contact the planar piston contact area.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Preferred example embodiments will hereinafter be described in conjunction with the appended drawings, wherein like designations denote like elements, and wherein.

DETAILED DESCRIPTION

The radiating spacer embodiments described herein can be coupled to a brake pad backing plate, preferably after the friction pad has been worn, to increase the pad thickness, improve thermal management, and improve performance interactions between the brake pad and the caliper. In some embodiments, the radiating spacer is made from a different material than the backing plate, such as stainless steel or titanium to cite two examples, which offer improved thermal insulation characteristics, and potential weight advantages. In an advantageous implementation, the radiating spacer has a plurality of cooling grooves on the backing plate facing side, with a planar caliper piston contact area located on the caliper facing side. The planar caliper piston contact area, as opposed to typical corrugated shims or the like, provides more structural rigidity for improved interaction between the caliper piston and the brake pad.

Figure 1:
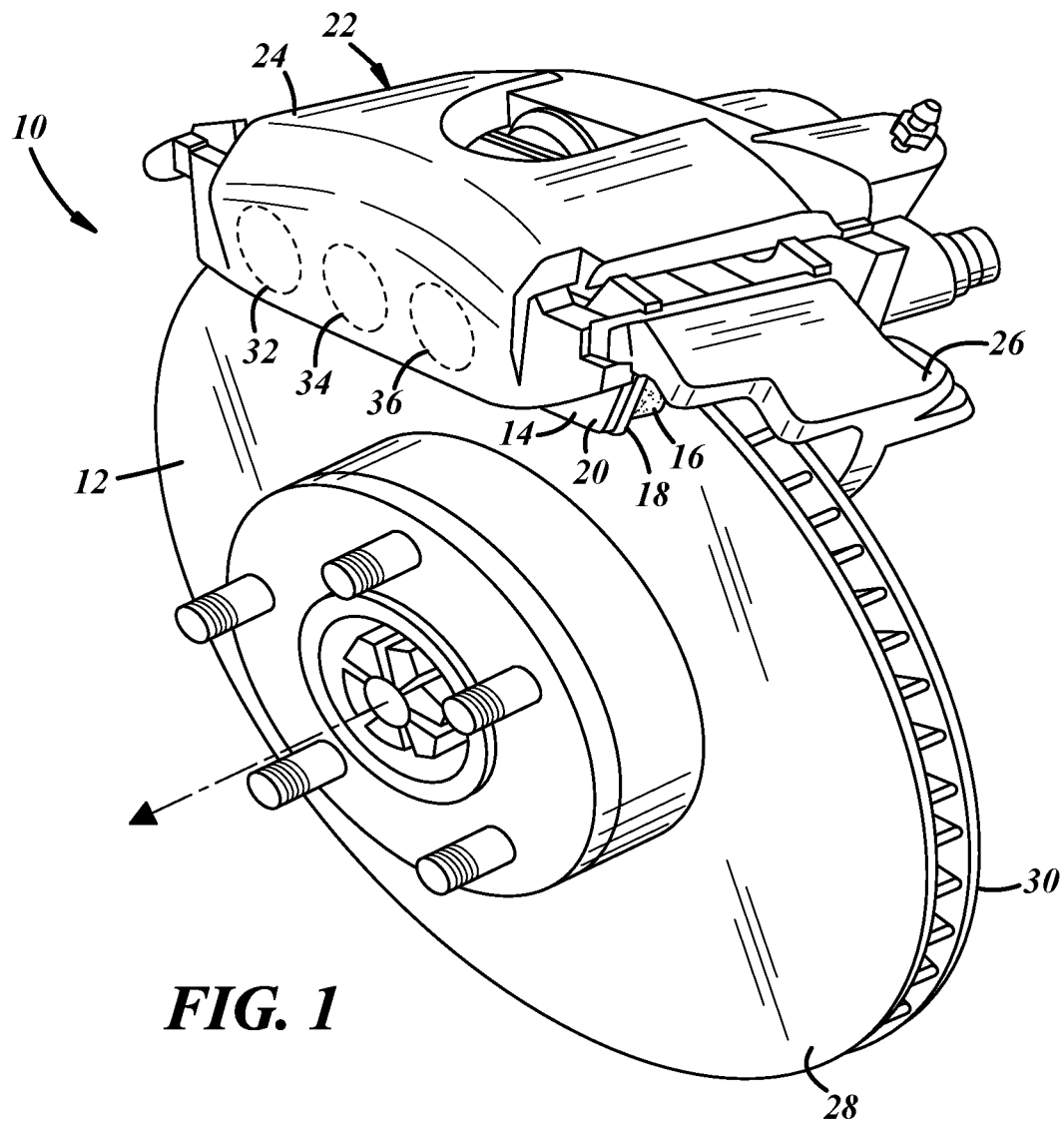
FIG. 1 is a perspective view of a braking system according to one embodiment.

FIG. 1 illustrates one embodiment of a braking system 10. Braking system 10 is a disc braking system that uses a rotatable brake element in the form of a rotor 12. However, the vehicle brake components described herein may be adapted for or used with other braking systems. It is also possible for the rotor 12 and the disc braking system 10 to take different forms, such as with a different caliper arrangement, rotor design, etc.

The braking system 10 includes a brake pad 14 having a friction pad 16, a backing plate 18, and a radiating spacer 20. The caliper 22 holds the brake pad 14 and another brake pad (not shown) on opposing sides of rotor 12. The caliper assembly 22 includes a caliper housing 24 and a caliper bracket 26, and may be any operable type of caliper, such as floating, sliding, or fixed. In operation, the friction pads 16 are clamped against opposing braking surfaces 28, 30 of the rotor 12 to inhibit rotation of the vehicle wheel. This clamping force is provided by one or more caliper pistons 32, 34, 36. The braking system 10 may be an opposed piston type disc brake, which has the three caliper pistons 32, 34, 36 on one side 28 and another three pistons on the other side 30. The braking system 10 is advantageously a high-performing braking system, such as one for a GT3 race car or the like. In such an implementation, quality and control of the braking force is important given the high travel speeds, and accordingly six pistons or more (e.g., ten pistons) may be included in the caliper assembly 22. Moreover, stabilizing the pedal feel while increasing the rigidity of the brake pad 14 using the radiating spacer 20, which is detailed below, can help caliper and overall braking performance.

Figure 2:
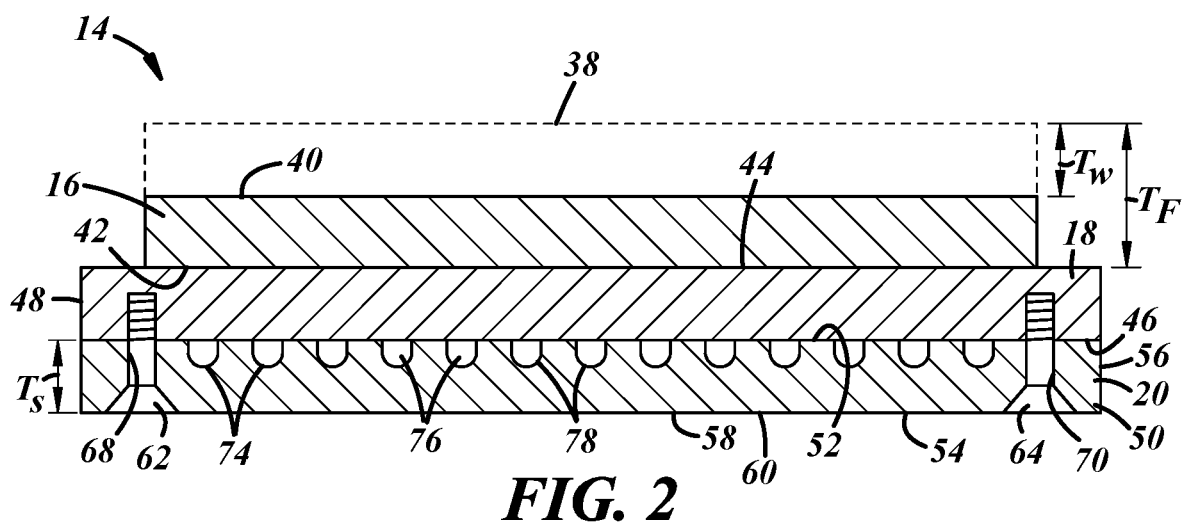
FIG. 2 is a cross-section view of an assembly of a brake pad from the braking system of FIG. 1 with a radiating spacer.

FIG. 2 is a cross-section view of the brake pad 14. The brake pad 14 includes the friction pad 16, backing plate 18, and radiating spacer 20. The illustrated configurations for the friction pad 16, the backing plate 18, and/or the radiating spacer 20 are just examples, as other geometries, features, etc., may be possible depending on factors such as the caliper design. Advantageously, the radiating spacer 20 is attached to the backing plate 18 after the friction pad 16 has worn down. This can reduce the travel amount that the pistons 32, 34, 36 need to extend, resulting in improved braking performance, particularly in applications such as high-speed racing, in commercial vehicles, and possibly in railway applications. FIG. 2 schematically shows a worn amount 38 of friction material, such that overtime, the original thickness $T_F$ of the friction pad 16 has decreased by a particular worn thickness $T_W$. The thickness $T_S$ of the radiating spacer 20 is advantageously equal to or close to the thickness $T_W$ of the friction material that has worn away. The radiating spacer 20 is particularly effective in brake pads 14 where the new overall thickness is greater than 18 mm.

The friction pad 16 interacts with a braking surface such as the rotor 12 to inhibit rotational motion and stop the vehicle. The rotor 12 is used as an example herein to positionally describe one or more features of the brake pad 14. Accordingly, directional terms such as inboard and outboard may be used to describe whether a component faces toward the rotor 12 (e.g., inboard) or away from the rotor (e.g., outboard) when the brake pad 14 is installed. The friction pad 16 includes an inboard-facing friction surface 40 and an outboard-facing attachment surface 42. The friction surface 40 may include other features that are not illustrated, such as chamfers, slots, curved edges, wear sensors or indicators, etc. The attachment surface 42 directly opposes or contacts the backing plate 18, although other layers such as an adhesive layer or the like may be included. The friction pad 16 may be made from any operable material, such as a non-asbestos organic (NAO) material, a ceramic material, or a semi-metallic material (e.g., about 30-65 wt % metal).

The backing plate 18 is located between the friction pad 16 and the radiating spacer 20. Typically, caliper pistons 32, 34, 36 directly contact the backing plate 18, but in this implementation, the radiating spacer 20 helps compensate for the loss in thickness $T_W$ in the friction pad 16, while maintaining sufficient structural rigidity to withstand the braking forces. Other layers may be included, such as other shim or damping layers, but in a preferred embodiment, the caliper pistons 32, 34, 36 directly contact the radiating spacer 20 after the spacer is installed on the backing plate 18. The backing plate 18 is typically a steel plate, and more specifically high tensile steel, the configuration of which is dictated by the needs of the braking system or caliper design. Accordingly, other features, shapes, materials, etc. besides those illustrated and described may be employed for the backing plate 18, such as additional caliper attachment projections, eye holes, etc., to cite a few examples. The backing plate 18 has an inboard surface 44, an outboard surface 46, and an outer perimeter 48.

The radiating spacer 20 is coupled to the outboard surface 46 of the backing plate 18. The radiating spacer 20 comprises a plate body 50 having a backing plate facing side 52, a caliper facing side 54, and an outer perimeter 56. Advantageously, as shown more particularly in FIG. 3, the outer perimeter 56 of the plate body 50 coincides with and is dimensionally the same as the outer perimeter 48 of the backing plate 18, although this is not necessary. Having the same plan view geometry, however, can help when fitting the pad 14 with the caliper 22, but other configurations are certainly possible.

The plate body 50 of the radiating spacer 20 is advantageously metal, which is different than most rubber shims or the like. To help promote thermal conductivity, the metal material for the spacer 20 preferably has a lower coefficient of thermal conductivity than the metal material for the backing plate 18. In a particularly advantageous embodiment, the backing plate 18 is made from high tensile steel (~42 W/(m*K)), and the plate body 50 of the spacer 20 is made from titanium (~20 W/(m*K)) or stainless steel (~14 W/(m*K)). Having the coefficient of thermal conductivity of the radiating spacer 20 be about half or less than half of the coefficient of thermal conductivity of the backing plate 18 can bolster heat transfer capabilities within the braking system 10. Steel-based as used herein includes steel alloys comprising 50 wt % or more of a steel alloy, along with potentially other alloying elements. Titanium-based as used herein includes titanium alloys comprising 50 wt % or more of titanium. Stainless steel can be beneficial to use as it may not require painting or zinc coating. Titanium also has benefits, in that can provide a weight reduction over steel. Titanium can be expensive, but it is envisaged that the radiating spacer 20, as detailed below, will be reusable. Both stainless steel and titanium also have high tensile strength properties, which helps with structural rigidity. Further, while it is preferable to use different materials for the backing plate 18 and the radiating spacer 20, in some embodiments, the materials for the backing plate and the radiating spacer are the same.

Figure 3:
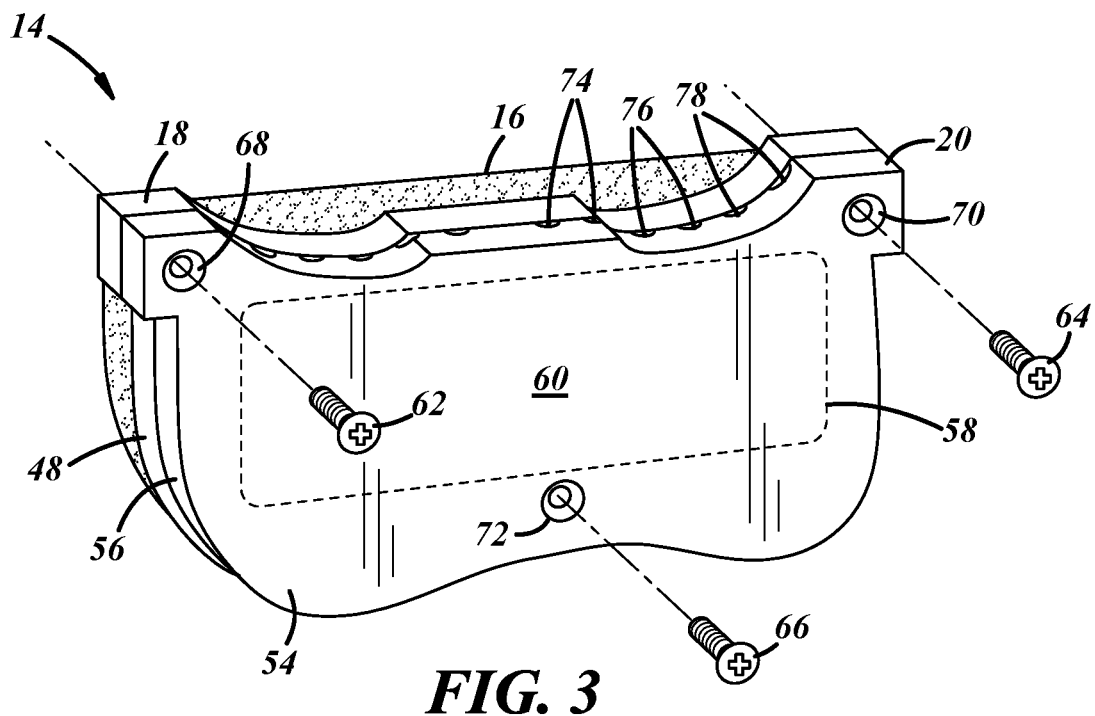
FIG. 3 is a rear view of the brake pad and radiating spacer assembly of FIG. 2, showing the caliper facing side of the radiating spacer.

FIG. 3 illustrates the caliper facing side 54 of the radiating spacer 20. The caliper facing side 54 includes a planar caliper piston contact area 58. The planar caliper piston contact area 58 has a flat surface 60 that is contacted by each of the caliper pistons 32, 34, 36. The flat surface 60 is point continuous without having any grooves, holes, recesses, etc. Having the planar caliper piston contact area 58 with the flat surface 60 can reduce distortion and flex in the plate body 50 that can occur during high-pressure braking, especially when the plate body 50 is made from a high tensile strength material such as steel or titanium. Further, having the caliper pistons 32, 34, 36 act directly on the flat surface 60 can help promote a more consistent braking response. The planar caliper piston contact area 58 and flat surface 60 are advantageously located in an unobstructed center portion of the caliper facing side 54. The planar caliper piston contact area 58 and flat surface 60 makes up more than 50% of the area of the caliper facing side 54, and preferably, more than 75% of the area of the caliper facing side, which can provide more ample room for a variety of different caliper piston arrangements.

As seen on the caliper facing side 54 in FIG. 3, as well as the cross-section view of FIG. 2, a number of countersunk bolts 62, 64, 66 are used to attach the radiating spacer 20 to the backing plate 18. The bolts 62, 64, 66 sit in threaded holes 68, 70, 72 that extend into the body of the backing plate 18. The holes 68, 70, 72 are strategically located remote from the planar caliper piston contact area 58 so as to not affect the rigidity of the assembly. Moreover, use of a reusable attachment, such as the bolts 62, 64, 66, clips, or some other attachment mechanism, allows the radiating spacer 20 to be easily removed and used on a different brake pad, thereby making the use of more expensive materials, such as titanium, commercially feasible. Additionally, an owner or operator could have a set of spacers 20, all having a different thickness $T_S$, which can be interchangeably used as the thickness $T_F$ of the friction material changes. Thus, over the life of the pad 14, the thickness $T_S$ of the spacer 20 can be periodically increased to account for the friction material decrease. This can prolong the life of the pad 14. In the illustrated embodiment, the backing plate 18 is about 6 mm thick, the spacer thickness $T_S$ is about 6 mm, and the thread of each bolt 62, 64, 66 extends about 4 mm into the backing plate (for a length of 10 mm). The thread is an M5 thread, and this, along with the various thickness and lengths shown and described herein, can be varied depending on the desired implementation.

Figure 4:
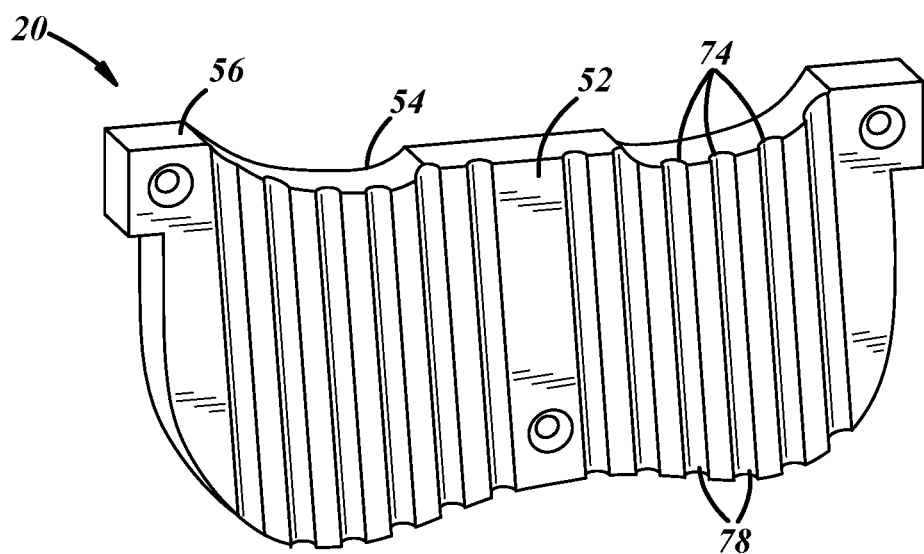
FIG. 4 shows the backing plate facing side of the radiating spacer of FIGS. 1-3.

FIG. 4 shows the inboard backing plate facing side 52 of the radiating spacer 50, which includes a plurality of cooling channels 74 (only a few are labeled in the figures for clarity purposes). Each cooling channel 74 creates an elongated airgap 76 (see FIG. 2) between the radiating spacer 50 and the backing plate 18. This can further improve the thermal responsiveness of the brake pad 14. Each cooling channel 74 in this embodiment is a rounded, U-shaped channel 78; however, other shapes are possible, such as a square shaped or more angular shaped channel. The shape of each channel 74 may be dependent at least partially on the manufacturing method. For example, the rounded U-shaped channel might be machined, whereas it might be easier to get a square shaped channel if the plate body 50 is cast or printed.

Each cooling channel 74 advantageously runs from the top edge of the outer perimeter 56 to the bottom edge, which may help promote airflow through the channel. In the illustrated embodiment, each cooling channel is about 5 mm wide and together, the plurality of cooling channels 74 covers about 50% of the total surface area of the backing plate facing side 52. Additionally, the cooling channels 74 strategically only extend partially into the thickness $T_S$ of the plate body 50. The depth of the channels 74 is preferably 60% or less of the thickness $T_S$ of the plate body 50. This amount allows for a sufficient material thickness directly adjacent to the planar caliper piston contact area 58 on the caliper facing side 54, so as to increase the rigidity at the flat surface 60 and improve performance.

Figure 5:
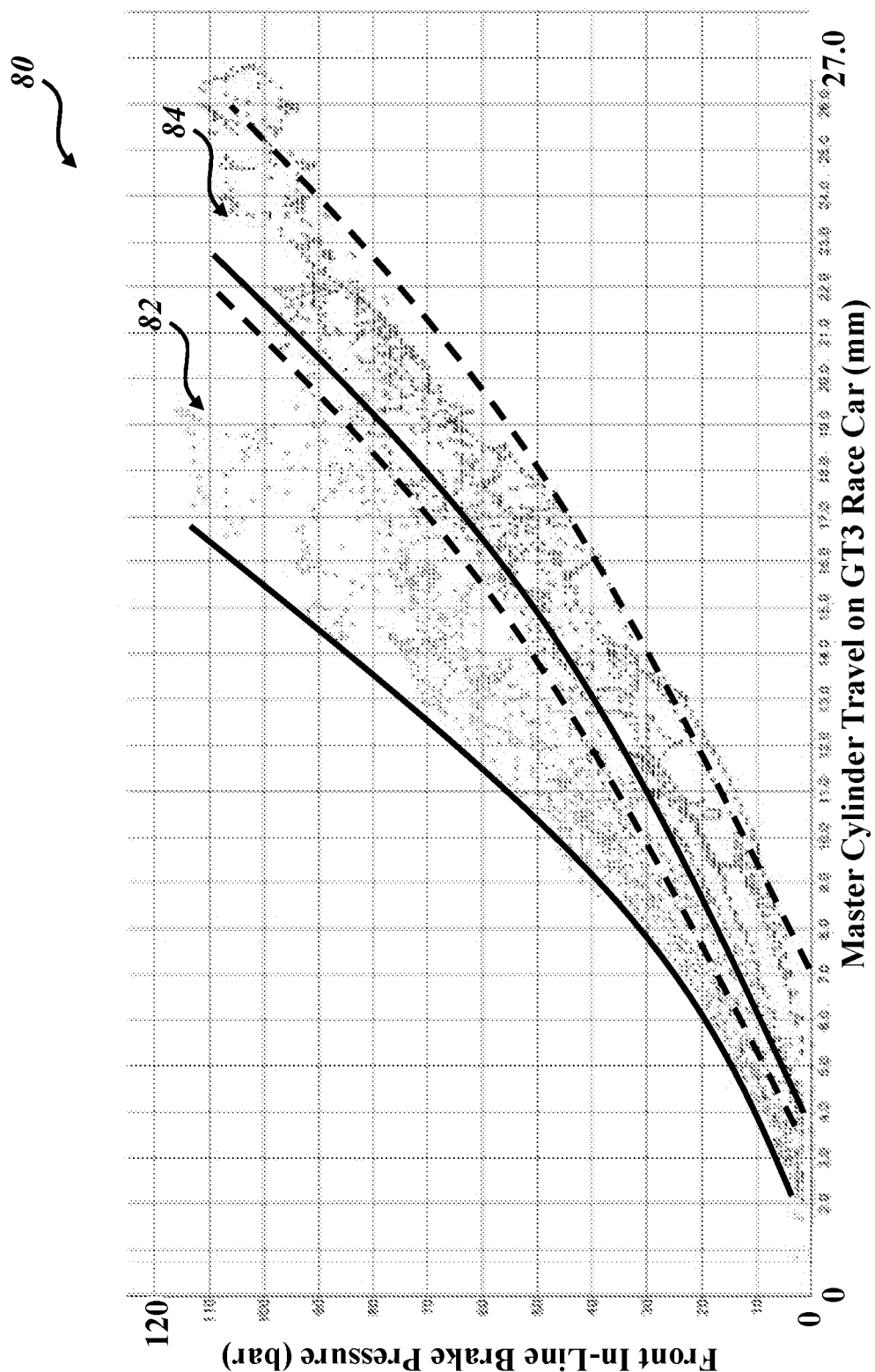
FIG. 5 is a graph showing front in-line brake pressure vs. master cylinder travel on a GT3 race car, comparing new brake pads with partially worn brake pads.

FIG. 5 is a graph 80 illustrating front in-line brake pressure vs. master cylinder travel on a GT3 race car. The area 82 bounded by solid lines represents new brake pads with 29.0 mm average thickness, whereas the area 84 bounded by dotted lines represents the same brake pads with 25.0 mm average thickness (i.e., the wear amount $T_W$ for the pads represented in area 84 is about 4 mm). With only a relatively small amount of wear, it can be seen that the cylinder travel needed to obtain the same braking pressure is greater. To solve this problem, the radiating spacer 20 can be attached to the worn pad to shift the amount of cylinder travel needed back for a given amount of pressure. Moreover, at least in part because of the radiating effects of the spacer 20 (whether from having the different metal materials with respective coefficients of thermal conductivity and/or having cooling channels 74), and given the flat, more structurally rigid planar caliper piston contact area 58, the braking system 10 can maintain superior performance for a longer time, which is particularly beneficial in applications such as racing.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A radiating spacer for a brake pad, comprising:
   a plate body having a backing plate facing side and a caliper facing side;
   a plurality of cooling grooves in the backing plate facing side of the plate body, wherein each cooling groove of the plurality of cooling grooves extends only partially into the plate body; and
   a planar caliper piston contact area located on the caliper facing side of the plate body, wherein the planar caliper piston contact area is configured to provide a flat surface for contact with a caliper piston.

2. The radiating spacer of claim 1, wherein each cooling groove of the plurality of cooling grooves is a rounded U-shaped channel.

3. The radiating spacer of claim 1, wherein the plate body is steel-based or titanium-based.

4. The radiating spacer of claim 1, wherein the plate body is configured to be used on a plurality of different brake pads.

5. The radiating spacer of claim 1, wherein the plurality of cooling grooves covers 50% or more of the backing plate facing side of the plate body.

6. The radiating spacer of claim 1, wherein the flat surface of the planar caliper piston contact area covers a continuous 80% or more of the caliper facing side of the plate body.

7. A brake pad, comprising:
   the radiating spacer of claim 1;
   a backing plate coupled to the radiating spacer; and
   a friction pad coupled to the backing plate.

8. The brake pad of claim 7, wherein the backing plate is made from a first metal material and the plate body of the radiating spacer is made from a second metal material and the second metal material has a lower thermal conductivity coefficient than the first metal material.

9. The brake pad of claim 8, wherein the first metal material is steel-based and the second metal material is titanium-based.

10. The brake pad of claim 7, wherein the backing plate is coupled to the radiating spacer via a removable attachment.

11. The brake pad of claim 7, wherein a thickness of the plate body of the radiating spacer correlates with a corresponding loss of thickness in the friction pad.

12. A braking system, comprising:
   the brake pad of claim 7; and
   a caliper holding the brake pad, the caliper having a piston and the piston is configured to contact the planar piston contact area of the caliper facing side of the plate body of the radiating spacer.

13. The braking system of claim 12, wherein the caliper has a plurality of pistons and each piston of the plurality of pistons is configured to contact the planar piston contact area.

14. A braking system, comprising:
   a brake pad comprising a radiating spacer, a backing plate coupled to the radiating spacer, and a friction pad coupled to the backing plate, wherein the radiating spacer has a plate body with a backing plate facing side and a caliper facing side, with a planar caliper piston contact area located on the caliper facing side, wherein the planar caliper piston contact area is a flat surface, wherein the backing plate includes one or more cooling grooves in the backing plate facing side of the plate body, wherein each cooling groove of the one or more cooling grooves extends only partially into the plate body; and
   a caliper holding the brake pad, the caliper having a piston and the piston is configured to contact the planar caliper piston contact area at the flat surface.

15. The braking system of claim 14, wherein the caliper has a plurality of pistons and each piston of the plurality of pistons is configured to contact the planar piston contact area.

* * * * *